April 14, 1959        F. S. ROBERTS        2,882,327
PROCESS OF PRODUCING RUBBER LATEX DISPERSION
CONTAINING RUBBER CRUMB GRANULES
Filed Nov. 15, 1954

INVENTOR:
FRANK SOMERVILLE ROBERTS

United States Patent Office 2,882,327
Patented Apr. 14, 1959

2,882,327

PROCESS OF PRODUCING RUBBER LATEX DISPERSION CONTAINING RUBBER CRUMB GRANULES

Frank S. Roberts, Bramhall, England

Application November 15, 1954, Serial No. 468,921

Claims priority, application Great Britain
November 16, 1953

2 Claims. (Cl. 260—723)

This invention relates to a new composition of matter and to a process of producing the same.

The composition of matter of the present invention comprises a sheet or band consisting of particles of granular material of an organic nature, which granules are bonded together locally in the form of straight and branched chains to present a large number of intercommunicating cavities open to the atmosphere some of which may be seen to extend throughout the entire depth of the layer of composition. The size of such cavities may amount from a fraction of a millimetre up to 3 or even 4 millimetres.

Whilst the material of the present invention is capable of numerous industrial and domestic uses, it is particularly suitable for use as an underlay for carpets and other floor coverings and in fact it may be secured or applied to the underside of carpet material, thus permitting the carpet material to be cut to any desired pattern without the necessity of subsequently binding the edges thereof.

The process of the present invention for producing the aforesaid material, broadly comprises incorporating with a foamable aqueous solution or suspension of a natural or synthetic resin adhesive, a granular material of organic nature, such as rubber crumb, in the proportion of between 2 and 14 parts by volume of granular material to 1 part by volume of total resin content of the solution or suspension of adhesive, thereupon foaming the mix to form air bubbles each bounded by an envelope of aqueous adhesive, thereafter drying the foamed mixture in the form of a layer under such conditions that before the granules have begun to settle out, the envelopes enclosing said air bubbles are destroyed and said granules are bonded together locally by the resin of the destroyed envelopes, in the foam of straight and branched chains to present a large number of intercommunicating cavities open to the atmosphere.

From the foregoing it will be seen that the product of the present invention is essentially different from normal cellular rubber in which the foamed condition is maintained in the solid state in contradistinction to which, in accordance with the present invention, the structure of the air-enclosing envelopes is gradually destroyed.

Contrary to expectation, it has been found that the granular material does not pack down at all during the destruction of the foam and that the cavities hereinbefore referred to remain when the material has become dry.

The granular material employed in carrying out the invention is preferably rubber crumb, although it may also be for example cork or saw-dust.

A particularly suitable material for the purpose of the present invention is waste rubber crumb obtained by grinding up for example the rubber of used motor car tires and normally employed in the manufacture of rubber soles and heels.

The adhesive employed preferably consists of a rubber latex mix containing the usual additional ingredients such as stabilizers, vulcanizing ingredients and the like. However, it is also possible to employ synthetic rubber latices, such as neoprene, G. R. S. styrene-butadiene copolymer mixtures or artificial latices of natural, synthetic or reclaimed rubber.

In addition, it is possible to employ aqueous suspensions of synthetic resins, such as polyvinyl chloride or polyvinyl acetate.

The foaming may be effected by any suitable means, for example, by mechanical whisking or stirring or by conventional chemical foam-producing agents.

In order to enable the invention to be more readily understood, reference is made to the accompanying drawings in which.

Figure 1:
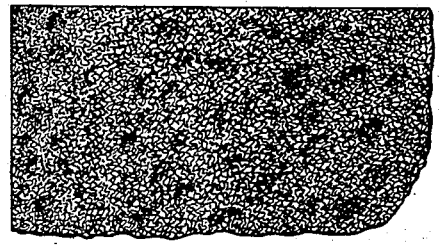
Figure 1 illustrates a section of the product of the present invention.
Figure 2:
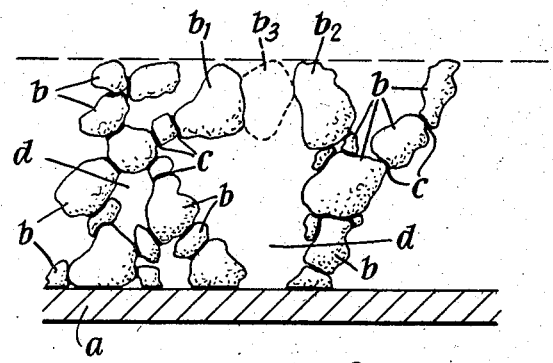
Figure 2 is an exaggerated diagrammatic representation of part of the product illustrated in Figure 1 indicating the manner in which the granules are bonded together locally in the form of straight and branched chains.

Figure 2 shows a backing $a$ of hessian to which is secured a layer of the finished product of the present invention, which, as can be seen, comprises a number of granules $b$ of irregular shape and size consisting of crumb rubber, which granules are interconnected locally by bonding medium (as indicated by the thickened lines $c$) in the form of straight and branched chains. It will be seen that at $d$, an air space is formed which extends throughout the depth of the finished composition but the granules $b^1$, $b^2$ are interconnected at the rear of the air space by the granule $b^3$.

It will thus be seen that the material of the present invention is entirely dissimilar from a sponge rubber structure.

Figure 3:
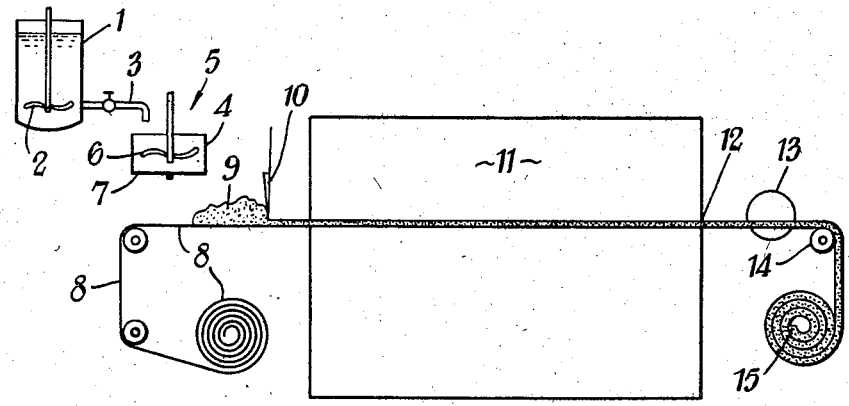
Figure 3 shows diagrammatically and by way of example, one embodiment of apparatus suitable for carrying the process of the invention into practical effect.

In the embodiment of apparatus illustrated in Figure 3, 1 denotes a mixer in which the adhesive mix is prepared and stirred by means of a stirrer 2. From the mixer 1, the adhesive mix issues through a valve-controlled conduit 3 into a foaming apparatus 4. Granulated rubber crumb is next introduced into the apparatus 4 at 5 and the mixture is foamed by means of a stirrer 6.

When the foam has been produced, the stirrer 6 is raised and the vessel 4 is tilted about a pivot 7 to discharge the foamed material on to a travelling fabric base 8 at 9. The foamed mixture then moves under a spreader or doctor blade 10 which ensures the application of a coating of uniform thickness on to the base 8.

In practice the thickness of the coating may vary between 1 mm. and about 120 mm.

The coated base then travels through a drying chamber 11 where it is dried at a temperature of for example 95 to 105° C. in order to prevent skin formation on the surface of the mix.

The dry coated material issues from the drying chamber 11 at 12 and passes between two trimming knives 13 (only one of which is shown) which trim the edges thereof, after which the material passes over rollers 14 and is wound up at 15.

According to one embodiment of the invention, a rubber latex mix consisting of parts by weight of the following ingredients:

130 parts of concentrated rubber latex known under the registered trademark "Revertex";
50 parts of reclaim dispersion;
2.5 parts of sulphur;
0.75 part of zinc diethyldithiocarbamate;
5 parts of zinc oxide;
100 parts of 5% sodium alginate aqueous solution;
25 parts of 10% casein aqueous solution; and
Water as required for viscosity adjustment;

formed in the mixer 1 was introduced into the apparatus 4 whereupon 200 parts by weight of a light red rubber crumb corresponding to 2.4 parts by volume of the volume of the rubber in the latex mix was introduced into the mix at 5 whilst stirring vigorously to produce air bubbles in the mix. When the mixing had been completed the vessel 4 was tilted to deposit the batch at 9 on a backing 8, for example, hessian. The mix was then uniformly spread on the backing 8 by the spreader 10, whereupon the coated backing was moved into the heated drying chamber 11 where it was slowly dried at a temperature of for example 95 to 105° C. in a moist atmosphere in order to prevent skin-formation on the surface of the mix.

According to another embodiment of the invention a rubber mix consisting of the following ingredients:

58.9 kgs. of the concentrated rubber latex known under the registered trademark "Revertex" 24.95 kgs. of black reclaim dispersion
10.42 kgs. of stabilizer
73.4 ccs. of a 10% solution of a sulphonated fatty alcohol
208.9 grams of a sodium salt of a polymerized alkylaryl sulphonic acid
998 grams off sulphur
998 grams of zinc diethyldithiocarbamate
998 grams of mercaptobenzothiozole
1995 grams of zinc oxide
99 grams of bentonite
293 grams of an antioxidant known as "Agerite White"
41.8 kgs. of a 5% aqueous solution of sodium alginate
41.8 kgs. of a 10% aqueous solution of casein; and
Water as required for viscosity adjustment;

was formed in the mixer 1. 60.6 kgs. of granulated cork (corresponding to approximately 5 parts by volume of the rubber in the latex mix) were then introduced into the mix at 5 whilst stirring vigorously to produce air bubbles in the mix. The mix was thereupon spread on to a backing and the coated backing slowly dried in the manner hereinbefore set forth.

In the embodiments hereinbefore described the base has been referred to as a fabric base. Suitable examples of such fabric bases are hessian, cotton scrim, paper, nylon fabric and the like. However, it is also possible to employ supports consisting of synthetic resin, leather and other relatively gas-impermeable materials depending on the purpose for which the final product is required.

It is also possible to dispense with the backing altogether, in which case however the mix must be spread on to a suitable support such as wire gauze from which it can be subsequently stripped when dry.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A process of producing a composition of matter, which comprises the steps of forming a mixture of a foamable aqueous natural rubber latex dispersion with rubber crumb granules of a size ranging from 0.1 mm. to 3 mm. in the proportion of between 2 and 14 parts by volume of said rubber crumb to 1 part by volume of the total rubber content of said rubber latex dispersion, stirring the mixture thus produced to foam said mixture to form air bubbles each bounded by an envelope of rubber adhesive, shaping said foamed mixture into a layer, then heating the layer at between 95° and 105° C. to dry said mixture and to collapse the envelopes enclosing said air bubbles thereby substantially destroying said foam without reducing the thickness of said layer, said heating being carried out at such a rate and for such a period of time that the rubber crumb granules do not settle out from the foam layer, whereby said rubber crumb granules are bonded into straight and branched chains to present a large number of intercommunicating cavities open to the atmosphere.

2. A composition of matter comprising a substantially homogenous sheet-like mass consisting of granules of rubber crumb, said granules being bonded together by natural rubber latex in straight and branched chains and presenting a large number of intercommunicating cavities open to the atmosphere throughout the depth of said sheet-like mass, said rubber crumb granules being of a size ranging from 0.1 mm. to 3 mm. and in the proportion between 2 and 14 parts by volume of said rubber crumb to 1 part by volume of the total rubber content of the natural rubber latex, with said rubber crumb granules disposed in said sheet-like mass without settling down therein, said composition of matter of said sheet-like mass being obtained from the process of claim 1.

References Cited in the file of this patent

UNITED STATES PATENTS

| | | |
|---|---|---|
| 2,568,866 | Osterhof et al. | Sept. 25, 1951 |
| 2,719,795 | Nottebohm | Oct. 4, 1955 |

OTHER REFERENCES

Serial No. 408,346, Menger et al. (A.P.C.), published June 1, 1943.